(12) United States Patent
Fohrer et al.

(10) Patent No.: US 9,687,014 B2
(45) Date of Patent: Jun. 27, 2017

(54) METHOD OF IMPROVING MICROBIOLOGICAL STABILITY IN A STILL WATER-BASED BEVERAGE AND MICROBIOLOGICALLY SHELF-STABLE STILL WATER-BASED BEVERAGES

(71) Applicant: NESTEC S.A., Vevey (CH)

(72) Inventors: Virginie Fohrer, Hareville (FR); Jacqueline Melo, Vittel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/652,914

(22) PCT Filed: Dec. 4, 2013

(86) PCT No.: PCT/EP2013/075574
§ 371 (c)(1),
(2) Date: Jun. 17, 2015

(87) PCT Pub. No.: WO2014/095377
PCT Pub. Date: Jun. 26, 2014

(65) Prior Publication Data
US 2015/0335057 A1    Nov. 26, 2015

(30) Foreign Application Priority Data

Dec. 18, 2012 (EP) ..................... 12197699

(51) Int. Cl.
*A23L 2/66* (2006.01)
*A23L 2/44* (2006.01)
*A23L 2/02* (2006.01)
*A23L 2/54* (2006.01)
*A23L 2/68* (2006.01)

(52) U.S. Cl.
CPC ...... *A23L 2/44* (2013.01); *A23L 2/02* (2013.01); *A23L 2/54* (2013.01); *A23L 2/68* (2013.01); *A23V 2002/00* (2013.01)

(58) Field of Classification Search
CPC ..... A23L 2/44; A23L 2/54; A23L 2/02; A23L 2/68
USPC .................. 426/590, 599, 392, 477
See application file for complete search history.

(56) References Cited

U.S. PATENT DOCUMENTS

2002/0127317 A1   9/2002   Hotchkiss et al.
2003/0113408 A1   6/2003   Clark et al.
2007/0154614 A1   7/2007   Sherwood et al.

OTHER PUBLICATIONS

Perigo et al. "The Effect of Carbonation, Benzoic Acid and pH on the Growth Rate of a Soft Drink Spoilage Yeast as Determined by a Turbidostatic Continuous Culture Apparatus" Journal of Applied Microbiology, vol. 27, No. 2, 1964, pp. 315-332, XP055061816.
Yuste et al. "Combination of Carbon Dioxide and Cinnamon to Inactivate *Escherichia coli* O157:H7 in Apple Juice" Journal of Food Science, vol. 67, No. 8, 2002, pp. 3087-3090, XP055061926.

*Primary Examiner* — Helen F Heggestad
(74) *Attorney, Agent, or Firm* — K&L Gates LLP

(57) ABSTRACT

The present invention relates to a method of improving microbiological stability in a still water-based beverage with respect to undesirable growth of microbiological spoilage such as yeast and/or mould growth during their preparation and/or storage.

14 Claims, No Drawings

METHOD OF IMPROVING MICROBIOLOGICAL STABILITY IN A STILL WATER-BASED BEVERAGE AND MICROBIOLOGICALLY SHELF-STABLE STILL WATER-BASED BEVERAGES

CROSS REFERENCE TO RELATED APPLICATIONS

The present application is a National Stage of International Application No. PCT/EP2013/075574, filed on Dec. 4, 2013, which claims priority to European Patent Application No. 12197699.7, filed on Dec. 18, 2012, the entire contents of which are being incorporated herein by reference.

TECHNICAL FIELD

The present invention relates to a method of improving microbiological stability in a still water-based beverage with respect to undesirable growth of microbiological spoilage such as yeast and mould growth during their preparation and/or storage. Said preservation method comprises at least one step of carbonating the still water-based beverage with a specific low carbon dioxide concentration.

BACKGROUND OF THE INVENTION

Still water-based beverages can be unsuitable for drinking for many reasons and, in particular, due to yeast and/or mould growth during their preparation and/or storage. For instance, fruit and/or vegetable containing water-based beverages are prone to yeast and/or mould growth.

Thus, it is necessary in the beverage industry to take steps to make certain that the beverage does not become spoiled due to undesirable microbial growth in the package between the time of manufacturing and ultimate consumption.

Available methods of improving microbiological stability in beverages use specific manufacturing and packaging technologies such as Hot Filling (HF) or also Cold Aseptic Filling (CAF). The main aim of these technologies is to protect the product from microbial spoilage. HF involves pasteurization of the beverage and its container such that the resulting sealed beverages do not contain spoilage microorganisms. Aseptic processing and packaging of a beverage, such as CAF, also aim to provide a product free of spoilage microorganisms.

However, even if various technologies are available, these methods require very expensive equipment and regular cleaning of the process line which is time-consuming and also expensive. In addition, the risk of accidental exposures to spoilage microorganisms cannot be set aside.

Preservatives have been also used in beverages to enhance their shelf-life by providing, in particular, microbial growth control or inhibition. Preservatives commonly used in beverages include, for instance, sulphur dioxide, sorbic acid and its salts, benzoic acid and its salts, cinnamic acid and its salts, dimethyl dicarbonate or a mixture thereof which have an antimicrobial activity and thus, prevent from the undesirable yeast and/or mould growth and microbial spoilage in beverages. Nevertheless, as consumer concern grows regarding more natural and healthier food, there has been a desire to reduce the concentration of preservatives in beverages or to replace them with other means.

In addition, such preservatives can frequently cause an off-flavour to the beverages when used at effective concentrations to actually prevent from microbial spoilage. Moreover, at a concentration sufficiently low to avoid off-flavour development, such preservatives are not efficient against microbial spoilage.

It is therefore an object of the invention to provide a method of improving microbiological stability in a still water-based beverage which comprises at least one step of carbonating said beverage wherein the carbon dioxide concentration of the resulting beverage is low, and which does not require expensive equipment or high concentration of preservatives, or to at least to provide a useful alternative.

SUMMARY OF THE INVENTION

The present invention provides an efficient and cost effective method of improving microbiological stability in still water-based beverages with respect to spoilage of microorganisms so as to enhance their shelf life. This method comprises at least one step of carbonating said beverage with a low carbon dioxide concentration.

In a first aspect of the invention, there is provided a method of improving microbiological stability in a still water-based beverage with respect to undesirable microbial growth, comprising at least one step of carbonating said beverage wherein the carbon dioxide concentration in the resulting beverage is from approximately 500 mg/L to 1000 mg/L.

In a preferred aspect of the invention, the carbon dioxide concentration in the resulting still water-based beverage is from approximately 750 mg/L to 1000 mg/L.

In another aspect of the invention, said step of carbonating comprises the steps of:
using a dosing unit to transfer the liquid carbon dioxide from a tank to a dosing valve, and
opening said dosing valve to transfer said carbon dioxide in solid form into a bottle.

In another aspect of the invention, there is provided a method of preserving a still water-based beverage wherein said beverage is an acidic beverage having, for example, a pH from approximately 1 to 5 and, in particular, a pH from about 2 to 4.

The method according to the invention may further comprise a step of adding at least one preservative and then, preferably, the total concentration of said preservative(s) in the still water-based beverage is approximately below 1000 mg/L or, preferably, below 400 mg/L.

In a preferred embodiment of the invention, said preservative is selected from the group comprising sulphur dioxide, sorbic acid and its salts, benzoic acid and its salts, cinnamic acid and its salts, vanillin, dimethyl dicarbonate, or a mixture thereof.

In another aspect of the invention, there is provided a method of preserving a still water-based beverage as described above, which further comprises a step in which said beverage is filled into a container and wherein said container may be selected form the group comprising glass bottles, plastic bottles, cartons, cans or kegs. Said plastic bottle is, for example, made of polyethylene terephthalate (PET).

Percentages are expressed as weight/volume unless indicated otherwise.

In another aspect of the invention, there is provided a microbiologically shelf-stable still water-based beverage comprising:
60% to 99% of water,
0% to 25% of fruit or vegetable juices,
0 to 2 g/L of plant extracts,
1000 mg/L of carbon dioxide, 0.5 g/L to 4 g/L of at least one acid, 100 mg/L to 400 mg/L of at least one preservative selected from the group comprising sorbic acid and its salts, benzoic acid and its salts, cinnamic acid and its salts, vanillin, dimethyl dicarbonate, or a mixture thereof, and at least one conventional ingredient selected from the group comprising flavouring agents, food coloring agents, natural or artificial sweeteners, salts, vitamins or emulsifiers.

In another aspect of the invention, said microbiologically shelf-stable still water-based beverage according to any one of the two preceding aspects is in plastic bottles, wherein said plastic bottles are, for example, made of PET.

DETAILED DESCRIPTION

The improving method according to the invention includes the killing, prevention and/or inhibition of the growth and/or the presence of yeasts and/or moulds in still water-based beverage.

"Still" beverage, as used herein, means a beverage where the carbon dioxide concentration remains below approximately 1000 mg/L. Indeed, it has been shown by the inventors that below this concentration sensory threshold, the consumer feels like it is a non-carbonated beverage.

Still water-based beverages according to the invention can be, for example, acidic beverages and thus have a pH from about 1 to about 5. In particular, these acidic beverages have a pH equal to or below about 4. In each case, suitable acids may be added to reach the required pH. Such acids can be selected, for example, in the group comprising phosphoric acid, citric acid, malic acid, fumaric acid, gluconic acid, and lactic acid, and mixtures of these acids.

"Microbiologically shelf-stable" beverages, as used herein, refer to beverages wherein uncontrolled mould and/or yeast growth is not observed within at least 1 month after their preparation, and preferably, 3 months or else 12 months.

"Water-based" beverages, as used herein, refer to beverage compositions having greater than 50% of water and, for instance, comprising from approximately 60% to 99% of water.

In particular, such beverages do not comprise beverages containing alcohols, milk or coffee.

Still water-based beverages according to the invention may especially comprise:
60% to 99% of water,
0% to 25% of fruit or vegetable juices,
0 to 2 g/L of plant extracts such as, for example, tea, ginger, gingko or ginseng extracts, rooibos, hibiscus, guarana, fruit extracts.
500 mg/L to 1000 mg/L of carbon dioxide,
0.5 g/L to 4 g/L of at least one acid such as, for example, citric acid,
0 to 1 g/L of at least one preservative, and
at least one conventional ingredient selected from the group comprising flavouring agents, food coloring agents, natural or artificial sweeteners, salts, vitamins or emulsifiers.

The preservative according to the invention may be, for example, selected from the group comprising sorbic acid and its salts, benzoic acid and its salts, cinnamic acid and its salts, vanillin, dimethyl dicarbonate (i.e. DMDC), or a mixture thereof.

Conventional ingredients according to the invention are, for example:
flavouring agents,
food colouring,
natural sweeteners such as, for example, sugar, maple syrup, molasses, barley malt and rice syrups, honey and agave nectar,
artificial sweeteners such as, for example, aspartame, sucralose and acesulfame potassium,
salts,
vitamins, and
emulsifiers.

The concentrations of the preservatives used, according to the invention, may vary over the following ranges, depending upon the nature of the beverage to be preserved, such as, for example:
about 0 to 500 mg/L of sorbic acid or its salts,
about 0 to 500 mg/L of benzoic acid or its salts,
about 0 to 500 mg/L of cinnamic acid or its salts,
about 0 to 250 mg/L of DMDC.

These preservatives can be used alone or as a mixture. When a mixture of preservatives is used, the total preservative concentration in the beverage obtained by the method of improving microbiological stability according the invention may remain below 1000 mg/L or, preferably, below 400 mg/L or else below 350 mg/L.

In addition, a microbiologically shelf-stable still water-based beverage according to the invention may, for example, comprise a total preservative concentration of approximately 100 mg/L to 400 mg/L and, in particular, about 400 mg/L or 350 mg/L. Preferably the total preservatives concentration in said microbiologically shelf-stable still water-based beverage is approximately 250 mg/L or about 150 mg/L or about 100 mg/L.

At a preservative concentration below the threshold of 1000 mg/L, the off-flavour is avoided or at least attenuated. Moreover, the consumer's desire to consume a beverage having a reduced concentration of preservatives is satisfied.

The improving method according to the invention comprises a step of carbonating which means that a specific amount of carbon dioxide is added to the beverage so as to obtain the required carbon dioxide concentration in the resulting still water-based beverage.

"The resulting still water-based beverage" is thus the still water-based beverage obtained after carbonating step.

This carbonating step can be performed with a carbonator beverage filling machine where the carbon dioxide is dosed and dissolved in gaseous form into the beverage. Alternatively, a dosing unit as described in the patent application FR 2 799 137 can be used. Said dosing unit is used to transfer the liquid carbon dioxide from a tank to a dosing valve. When this valve is opened, the liquid carbon dioxide is converted into solid form and falls into the beverage's container. Using the latter device makes it easier to reach the required low carbon dioxide concentration in the resulting still water-based beverage.

Other methods known to the skilled person may also be used.

The carbonating step may take place before or after the filing phase wherein the still water-based beverage is filled into the container.

As used in this specification, the words "comprises", "comprising", and similar words, are not to be interpreted in an exclusive or exhaustive sense. In other words, they are intended to mean including, but not limited to.

Any reference to prior art documents in this specification is not to be considered as an admission that such prior art is widely known or forms part of the common general knowledge in the field.

The invention is further described with reference to the following examples. It will be appreciated that the invention as claimed is not intended to be limited in any way by these examples.

EXAMPLE 1

The following composition of a still water-based beverage is prepared in a PET bottle of 500 mL:
996 g/L of water,
350 mg/L of hibiscus extracts,
90 mg/L of acesulfame potassium
150 mg/L of aspartame,
2 g/L of citric monoacid,
20 mg/L of caramel color,
450 mg/L of flavour agent,
500 mg/L of carbon dioxide,
300 mg/L of vanillin, and
200 mg/L of potassium cinnamate.

Ingredients are mixed in a batch production, filled in PET bottles and pasteurized.

The carbonating step is performed in batch production, using pilot scale carbonator equipment, so that the carbon dioxide concentration in the resulting still water-based beverage is 500 mg/L.

The step of carbonating is carried out, using the same equipment, either before or after the filling step of the beverage.

After pasteurization, bottles are inoculated separately with two mixtures of microorganisms, respectively moulds and yeasts, for performing a challenge test.

The mould and yeast strains used are as follows:

| MOULDS | YEASTS |
|---|---|
| *Penicillium corylophilum* | *Candida tropicalis* |
| *Aspergillus niger* | *Filobasidiella neoformans* |
| *Fusarium oxysporum* | *Pichia anomala* |
| *Aureobasidium pullulans* | *Rhodotorula mucilaginosa* |
| *Exophiala dermatitidis* | *Saccharomyces cerevisiae* |

The five mould and five yeast strains were diluted and mixed together to achieve the desired concentration in colony forming units (CFU) per bottle. For both tested compositions, the determination of germ count of, respectively, yeasts and moulds was determined by membrane filtration.

When the number of yeast or mould colonies is decreasing with time or equal to 0, it is considered that the yeast or mould growth is under control.

The results of these challenge tests are shown in Table 1:

TABLE 1

| Composition | Microorganism | RESULTS (months) | | | | | |
|---|---|---|---|---|---|---|---|
| | | 0 | 1 | 3 | 6 | 9 | 12 |
| Example 1 | Yeasts 593 CFU/bottle | 311 | 0 | 0 | 0 | 0 | 0 |
| | Moulds 440 CFU/bottle | 209 | 80 | 47 | 46 | | |

The grey cells in the table indicate that uncontrolled growth of microorganisms was observed.

The results show that the method according to the invention prevents, in the composition of example 1:
uncontrolled yeast growth during at least 12 months
uncontrolled mould growth during 6 months.

EXAMPLE 2 (COMPARATIVE EXAMPLE)

A still water-based beverage is prepared in a bottle of 500 mL in an analogous way as for the composition of example 1, except that it does not contained carbon dioxide. No carbonating step was, then, performed.

The composition of example 2 was then tested in the presence of the same two mixtures of microorganisms as those used in example 1 and in the same conditions.

The results of the corresponding challenge test are shown in Table 2:

TABLE 2

| Composition | Microorganism | RESULTS (months) | | | | | | | |
|---|---|---|---|---|---|---|---|---|---|
| | | 0 | 0.5 | 1 | 2 | 4 | 6 | 9 | 12 |
| Example 2 | Yeasts 467 CFU/bottle | 377 | 9 | 0 | 0 | 0 | 0 | 0 | 0 |
| | Moulds 466 CFU/bottle | 303 | 96 | 62 | 65 | | | | |

The grey cells in the table above also indicate that uncontrolled growth of microorganisms was observed.

The results show that the microbiological stability of the composition of example 2 is decreased compared with the one observed for example 1.

Indeed, in the composition of example 2:
yeast growth was under control during at least 12 months, and
mould growth was under control during only 2 months.

EXAMPLE 3

A still water-based beverage is prepared in a bottle of 500 mL in an analogous way as for the composition of example 1 and comprises the following components:
948 g/L of water,
8.27 g/L of apple juice (5%),
40 g/L of sugar,
1.9 g/L of citric monoacid,
350 mg/L of flavour agent,
500 mg/L of carbon dioxide,
200 mg/L of vanillin,
200 mg/L of potassium cinnamate, and
150 mg/L of potassium sorbate.

The composition of example 3 was then tested in the presence of the same two mixtures of microorganisms as those used in example 1 and in the same conditions.

The results of the corresponding challenge test are shown in Table 3:

TABLE 3

| Composition | Microorganism | RESULTS (months) | | | | | |
|---|---|---|---|---|---|---|---|
| | | 0 | 1 | 3 | 6 | 9 | 12 |
| Example 3 | Yeasts 593 CFU/bottle | 318 | 0 | 0 | 0 | 0 | 0 |
| | Moulds 440 CFU/bottle | 223 | 23 | 1 | 0 | 0 | 0 |

The grey cells in the table above also indicate that uncontrolled growth of microorganisms was observed.

The results show that the method according to the invention prevents, in the composition of example 3:
uncontrolled yeast growth during at least 12 months, and
uncontrolled mould growth during at least 12 months.

EXAMPLE 4 (COMPARATIVE EXAMPLE)

A still water-based beverage is prepared in a bottle of 500 mL in an analogous way as for the composition of example 3, except that it contains 150 mg/L of vanillin instead of 200 mg/L and that it does not contain carbon dioxide. No carbonating step was, then, performed.

The composition of example 4 was then tested in the presence of the same two mixtures of microorganisms as those used in example 1 and in the same conditions.

The results of the corresponding challenge test are shown in Table 4:

TABLE 4

| Composition | Microorganism | RESULTS (months) | | | | | | | |
|---|---|---|---|---|---|---|---|---|---|
| | | 0 | 0.5 | 1 | 2 | 4 | 6 | 9 | 12 |
| Example 4 | Yeasts 467 CFU/bottle | 415 | 2 | 0 | 0 | 0 | 0 | 0 | 0 |
| | Moulds 466 CFU/bottle | 250 | 62 | 44 | 43 | 27 | 3 | | |

The grey cells in the table above also indicate that uncontrolled growth of microorganisms was observed.

The results show that the microbiological stability of the composition of example 4 is decreased compared with the one observed for example 3.

Indeed, in the composition of example 4:
yeast growth was under control during at least 12 months, and
mould growth was under control during only 6 months.

EXAMPLE 5

A still water-based beverage is prepared in a bottle of 500 mL in an analogous way as for the composition of example 1 and comprises the following components:
1000 g/L of water,
8.27 g/L of apple juice (5%),
40 g/L of sugar,
1.9 g/L of citric monoacid,
350 mg/L of flavour agent,
750 mg/L of carbon dioxide,
350 mg/L of potassium sorbate.

The composition of example 5 was then tested in the presence of the same two mixtures of microorganisms as those used in example 1 and in the same conditions.

The results of the corresponding challenge test are shown in Table 5:

TABLE 5

| Composition | Microorganism | RESULTS (months) | | | | | |
|---|---|---|---|---|---|---|---|
| | | 0 | 1 | 3 | 6 | 9 | 12 |
| Example 5 | Yeasts 310 CFU/bottle | 294 | 0 | 0 | 0 | 0 | 0 |
| | Moulds 410 CFU/bottle | 252 | 14 | 6 | | | |

The grey cells in the table above also indicate that uncontrolled growth of microorganisms was observed.

The results show that the method according to the invention prevents, in the composition of example 5:
uncontrolled yeast growth during at least 12 months, and
uncontrolled mould growth during 3 months.

EXAMPLE 6 (COMPARATIVE EXAMPLE)

A still water-based beverage is prepared in a bottle of 500 mL in an analogous way as for the composition of example 1, except that it does not contain carbon dioxide. No carbonating step was, then, performed.

The composition of example 6 was then tested in the presence of the same two mixtures of microorganisms as those used in example 1 and in the same conditions.

The results of the corresponding challenge test are shown in Table 6:

TABLE 6

| Composition | Microorganism | RESULTS (months) | | | | | |
|---|---|---|---|---|---|---|---|
| | | 0 | 1 | 3 | 6 | 9 | 12 |
| Example 6 | Yeasts 360 CFU/bottle | 265 | 0 | 0 | 0 | 0 | N/A |
| | Moulds 490 CFU/bottle | 433 | | | | | |

(N/A stands for not available)

The grey cells in the table above also indicate that uncontrolled growth of microorganisms was observed.

The results show that the microbiological stability of the composition of example 6 is decreased compared with the one observed for example 5.

Indeed, in the composition of example 6 yeast growth was under control during at least 12 months, but no mould growth control was observed.

The challenge tests of example 1 to 6 show that the method according to the invention provides an improved microbiological stability. Uncontrolled mould and yeast growth was observed after at least 3 months when the method according to the invention was implemented.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A method of improving microbiological stability in a still water-based acidic beverage comprising carbonating the beverage wherein the carbon dioxide concentration in the resulting still water-based beverage is from 500 mg/L to 1000 mg/L, the still water-based acidic beverage has a pH from 2 to 4.

2. The method according to claim 1 wherein the carbon dioxide concentration in the resulting still water-based acidic beverage is from 750 mg/L to 1000 mg/L.

3. The method according to claim 1, wherein the step of carbonating comprises the steps of:
   using a dosing unit to transfer the liquid carbon dioxide from a tank to a dosing valve; and
   opening the dosing valve to transfer the carbon dioxide in solid form into a bottle.

4. The method according to claim 1, comprising the step of adding at least one preservative.

5. The method according to claim 4, wherein the total concentration of the preservative in the still water-based acidic beverage is below 1000 mg/L.

6. The method according to claim 4, wherein the total concentration of the preservative in the still water-based acidic beverage is below 400 mg/L.

7. The method according to claim 4, wherein the preservative is selected from the group consisting of sulphur dioxide, sorbic acid and its salts, benzoic acid and its salts, cinnamic acid and its salt, vanillin, dimethyl dicarbonate, and mixtures thereof.

8. The method according to claim 1, comprising packaging the beverage into a container selected from the group consisting of glass bottles, plastic bottles, cartons, cans and kegs.

9. A microbiologically shelf-stable still water-based acidic beverage comprising:
   60% to 99% of water;
   0% to 25% of fruit juices;
   0 to 2 g/L of plant extracts;
   1000 mg/L of carbon dioxide;
   0.5 g/L to 4 g/L of at least one acid;
   100 mg/L to 400 mg/L of at least one preservative; and
   at least one ingredient selected from the group consisting of flavouring agents, food coloring agents, natural or artificial sweeteners, salts, vitamins and emulsifiers,
   the microbiologically shelf-stable still water-based acidic beverage has a pH from 2 to 4.

10. The microbiologically shelf-stable still water-based acidic beverage according to claim 9, wherein the preservative is selected from the group consisting of sorbic acid and its salts, benzoic acid and its salts, cinnamic acid and its salts, vanillin, dimethyl dicarbonate, and mixtures thereof.

11. The microbiologically shelf-stable still water-based acidic beverage according to claim 9, wherein the beverage is in plastic bottles.

12. A microbiologically shelf-stable still water-based acidic beverage comprising:
   60% to 99% of water;
   0% to 25% of fruit juices;
   0 to 2 g/L of plant extracts;
   1000 mg/L of carbon dioxide;
   0.5 g/L to 4 g/L of at least one acid;
   350 mg/L of at least one preservative; and
   at least one ingredient selected from the group consisting of flavouring agents, food coloring agents, natural or artificial sweeteners, salts, vitamins and emulsifiers,
   the microbiologically shelf-stable still water-based acidic beverage has a pH from 2 to 4.

13. The microbiologically shelf-stable still water-based acidic beverage according to claim 12, wherein the preservative is selected from the group consisting of sorbic acid and its salts, benzoic acid and its salts, cinnamic acid and its salts, vanillin, dimethyl dicarbonate, and mixtures thereof.

14. The microbiologically shelf-stable still water-based acidic beverage according to claim 12, wherein the beverage is in plastic bottles.

* * * * *